UNITED STATES PATENT OFFICE.

HAMILTON W. McKENZIE, OF ALLIANCE, OHIO.

IMPROVEMENT IN PLASTIC LININGS FOR FIRE-CHAMBERS.

Specification forming part of Letters Patent No. 210,347, dated November 26, 1878; application filed July 3, 1878.

*To all whom it may concern:*

Be it known that I, HAMILTON W. McKENZIE, of Alliance, in the county of Stark and State of Ohio, have invented a certain new and useful Plastic Lining for Fire-Chambers; and I do hereby declare that the following is a full, clear, and exact description thereof, which will enable others skilled in the art to which it appertains to make and use the same.

My new compound is designed for direct application for use in a plastic state or condition for fire-linings for grates, hot-air furnaces of all kinds, stoves, ranges, or fire-lining any surface exposed to intense heat.

I use fire-proof cement linings, as hereinafter stated, in a plastic, wet, or green state, and by slight pressure make them conform to the fire-chamber walls, and in which they are, when so laid, burned or biscuited by the heat from the fire made in the furnace, stove, grate, or range when set up for use, and which heat sets active the flux, and they become hard.

My invention embraces a new compound and process for application for immediate use in a fire-chamber, and which compound fluxes and sets under the heat of the fire in the chamber so lined with it.

My new compound is almost entirely free from expansion and contraction when exposed to great heat, and incombustible within any of the used degrees of heat. Repeated drying or freezing does not injure it. It is fluxed and becomes hard only under the action of the heat in the chamber when permanently applied, but can always be reduced to a plastic state by water before it is fluxed and hardened by heat.

The compound consists of Bolivar stone or clay as the principal article, fire-clay impregnated with mica or isinglass, asbestus or its equivalent, and borax or a soluble glass.

Bolivar stone is sometimes called "Bolivar clay." It is hard and flinty, and will stand several thousand degrees of heat before vitrifying. It derives its name from Bolivar, Pennsylvania, where it was discovered, and it is found in Ohio and Maryland, varying somewhat in quality. It expands very little from heat and contracts very slightly when cooled.

The mica is obtained in the raw clay in the mines, while asbestus is known to be absolutely incombustible, expanding and contracting very little, and prevents the lining from checking while under heat or when cooling suddenly. The fire-clay gives a smooth appearance to the lining when baked or burned, and adds to the plastic quality of the compound when worked. The borax or the soluble glass is to form a flux for the compound when made into the plastic lining and subjected to heat in the chamber which it lines.

I prepare the Bolivar stone by crushing it in any suitable manner until reduced to a coarse powder, the grains of which are about the size of wheat-kernels. I then submit this powder to an intense heat, such as would burn ordinary fire brick or tile, a sufficient length of time to take from it all shrinkage and greenish nature. I then grind this reduced burned Bolivar stone or clay and the fire-clay together in the proportions of three to one, or seventy-five per cent. of Bolivar stone or clay to twenty-five per cent. of fire-clay, and put in one and a half per cent. of its weight of asbestus and one per cent. of borax or soluble glass, and reduce the whole to a tolerably fine powder. I then make it into a plastic mass by water.

In a mass of twenty-two hundred and twenty pounds I would use of Bolivar stone sixteen hundred and twenty-five pounds; of fire-clay, five hundred and forty-one pounds; of asbestus, thirty-two and one-half pounds, and of borax, twenty-one and one-half pounds. I prefer to use borax as the flux. A slight deviation from these proportions will make no material change in the result.

The plastic fire-lining thus compounded may be packed away for use when desired, and will remain in such condition for months; and if hardened by the action of the air it can be again rendered plastic by water and reworking, because the function of the fluxing element remains inactive until the plastic lining is submitted to the action of heat in the fire-chamber.

In forming the plastic lining sufficient pressure must be applied to give the proper solidity.

All cracks in the castings are closed by it, and it will last longer than new castings. It is the only plastic or wet compound for fire-chamber linings known to me that will stand a sudden heat without cracking, spalling, or bursting without being first dried and burned. It will stand a greater degree of heat, expand and contract less, retain and communicate heat better than any other fire-lining of which I have any knowledge.

In heating-stoves and hot-air furnaces it produces a much softer atmosphere, producing much less carbon in the room. The tiles or linings may be made in any shape suitable for application. The lining will not vitrify short of $2500°$ or $3000°$ of heat, and the heat in hot-air furnaces and the like is seldom above $1200°$, and is generally between that and $600°$. Heating-stoves may be constructed of my plastic cement.

Clays impregnated with mica might in some cases be used instead of the Bolivar stone, and are clearly within the broad, though not specific, scope of its equivalents.

I have hereinbefore described a cement which can only be used in a plastic state. Yet dealers, in certain instances, require ready-made tiles for their stoves, and in the lining of new stoves, as contradistinguished from the repairing of old ones, ready-made tiles or bricks would be generally used. My invention is readily adapted to such use by mixing with the cement described, omitting the ingredient borax, a sufficient quantity of plaster-of-paris and soluble glass to render it capable of being molded and hardened enough for transportation. The tiles so made are not fluxed until subjected to the heat of the fire built in the furnace or stove to which they are applied; but they are merely rendered hard enough to suit the demands of certain dealers. I am thus enabled to produce tiles which, when laid, are fluxed by the heat of the fire made in the chamber or stove which they line. In other words, I harden my cement before fluxing, for certain trade purposes well understood, or send out set-hardened tiles not fluxed. To produce this adaptation of my plastic cement for the purpose, I take, say, one hundred pounds of the compounded cement described, and from which the borax has been omitted, and add to it ten pounds of plaster-of-paris and six pounds of soluble glass, and work or mix all together. This mass thus formed I put immediately into the proper molds, and in a few moments it is set-hardened without being fluxed, and ready for the purposes mentioned. Although plaster-of-paris is a non-conductor, yet the small percentage I use would not in any way injure the heat-communicating properties of my cement.

The proportions I have described need not be exactly followed, as a proper approximation, guided by good judgment, will answer.

It is not intended to claim, broadly, a plastic cement for lining or repairing fire-chambers, for the state of the art shows this to be not new with me; but my process and invention indicate a new compound, process, and important advantages.

I claim—

1. Fire-linings for furnaces, stoves, and the like, consisting of Bolivar stone or clay, fire-clay, asbestus, and a flux, substantially as herein set forth.

2. In the process of making plastic fire linings or tiles, Bolivar stone or clay, crushed to small grains and subjected to a high degree of heat, for the purpose stated, and then reduced to a fine powder, with the specified materials.

3. The process of making plastic fire-linings, which consists in crushing Bolivar stone or clay into small grains, subjecting them to intense heat, grinding these with the specified materials in the proportions substantially as set forth, and with water forming it into a plastic state for use as such linings.

4. A plastic fire-lining composed of Bolivar stone or clay, fire-clay, and asbestus, in combination with a fluxing agent made active subsequent to the application of the lining to the fire-chambers, for the purpose herein set forth.

5. A compound for fire-linings adapted to be molded and set-hardened, and fluxed only after application to the stove, consisting of Bolivar stone or its equivalent, fire-clay impregnated with mica or its equivalent, asbestus, plaster-of-paris, and soluble glass, substantially as and for the purpose set forth.

In testimony that I claim the foregoing I have affixed my signature in the presence of two witnesses.

HAMILTON W. McKENZIE.

Witnesses:
  O. B. HOOVER,
  W. A. S. H. KING.